United States Patent [19]
Morris et al.

[11] Patent Number: 5,153,936
[45] Date of Patent: Oct. 6, 1992

[54] DUAL DENSITY DIGITAL IMAGE SYSTEM

[75] Inventors: Hugh M. Morris, Gaithersburg; Carol A. Parks, Monrovia, both of Md.; Robert E. Probst, Reston, Va.; Yakov Tsalalikhin, Peekskill, N.Y.; Gary L. Youngs, Gaithersburg, Md.; Doraiswamy Rajagopal, Rockville, Md.

[73] Assignee: International Business Machines Corporation, Armonk, N.Y.

[21] Appl. No.: 559,526

[22] Filed: Jul. 19, 1990

Related U.S. Application Data

[63] Continuation of Ser. No. 211,646, Jun. 27, 1988, abandoned.

[51] Int. Cl.⁵ .................................................. G06F 15/40
[52] U.S. Cl. .................................... 395/128; 395/133; 395/162; 382/47; 340/731
[58] Field of Search ............... 364/518, 521; 340/747, 340/750, 731; 382/47, 44, 56; 395/128, 133, 162

[56] References Cited

U.S. PATENT DOCUMENTS

| | | | |
|---|---|---|---|
| 4,139,901 | 2/1979 | Ganske et al. | 364/900 |
| 4,164,024 | 8/1979 | Gilbert | 364/900 |
| 4,174,890 | 11/1979 | Johnson et al. | 353/26 A |
| 4,197,590 | 4/1980 | Sukonick et al. | 364/900 |
| 4,205,387 | 5/1980 | Ovshinsky et al. | 364/900 |
| 4,439,761 | 3/1984 | Fleming et al. | 340/735 |
| 4,485,454 | 11/1984 | Kimoto | 364/900 |
| 4,553,206 | 11/1985 | Smutek et al. | 364/300 |
| 4,553,261 | 11/1985 | Froessl | 382/57 |
| 4,574,395 | 3/1986 | Kato | 382/61 |
| 4,601,003 | 7/1986 | Yoneyama et al. | 364/518 |
| 4,635,136 | 1/1987 | Ciampa et al. | 358/342 |
| 4,672,186 | 6/1987 | Van Tyne | 235/470 |
| 4,672,680 | 6/1987 | Middleton | 382/44 |
| 4,677,574 | 6/1987 | Kausch | 364/521 |
| 4,677,575 | 6/1987 | Redin | 364/521 |
| 4,725,892 | 2/1988 | Suzuki et al. | 358/287 |
| 4,727,589 | 2/1988 | Hirose et al. | 382/56 |
| 4,764,975 | 8/1988 | Inoue | 382/47 |

FOREIGN PATENT DOCUMENTS

| | | |
|---|---|---|
| 8704826 | 8/1987 | European Pat. Off. |
| 8705767 | 9/1987 | European Pat. Off. |
| 8705768 | 9/1987 | European Pat. Off. |

*Primary Examiner*—Gary V. Harkcom
*Assistant Examiner*—Phu K. Nguyen
*Attorney, Agent, or Firm*—John E. Hoel

[57] ABSTRACT

A data processing system stores and displays digital images, and includes a workstation having a document input scanner for digitizing document images at a first resolution, an image display unit for displaying digitized document images at a second resolution which is less than the first resolution and a printer for printing digitized document images at a third resolution greater than the second resolution. The system reduces communications traffic and assures fast access time on the network since the bulk of the traffic will utilize the smaller compressed data records required for the second resolution. However, these improvements in communication traffic and access time do not sacrifice the availability of high resolution compressed data records occasionally needed for printing and other high resolution operations.

14 Claims, 5 Drawing Sheets

DUAL DENSITY DIGITAL IMAGE SYSTEM

This is a continuation of application U.S. Ser. No. 07/211,646 filed Jun. 27, 1988 now abandoned.

FIELD OF THE INVENTION

The invention disclosed broadly relates to data processing systems, and more particularly, relates to digital image storage systems.

BACKGROUND OF THE INVENTION

Many attempts have been made in the prior art to provide adequate storage for digitized images in data processing systems. Early prior art techniques were based upon the conversion of photographic microfiche records into digitized images which were then stored on either magnetic tape or magnetic disks for later retrieval and display. The problem with the early prior art was that since the digitized image records were quite large, they required substantial quantities of storage and this limited the appeal of such systems for practical applications.

As the prior art evolved, digital image compression algorithms were developed to convert the digitized bit patterns for the images into a more compressed record, which could be more conveniently stored on magnetic tape or magnetic disk devices. However, the size of these compressed records was still large enough to present a problem in providing adequate storage within a digital image storage system. In addition, because of the size of the compressed records, access times on the magnetic tape or magnetic disk storage devices was unacceptably long.

The prior art has failed to provide a digital image storage system which will provide a fast access time for either magnetic or optical disk storage, will have a minimized communications traffic on the communications networks used by the image storage system, and yet will maintain the availability of high resolution images for occasional high resolution requirements.

OBJECTS OF THE INVENTION

It is therefore an object of the invention to provide an improved digital image storage system.

It is another object of the invention to provide an improved digital image storage system which has a fast access time for the stored images.

It is yet a further object of the invention to provide an improved digital image storage system which imposes a lower traffic volume on communications systems connected therewith.

It is still a further object of the invention to provide an improved digital image storage system which has a fast access time for stored images, has a reduced impact on the communications traffic, and yet provides for the availability of high resolution images.

SUMMARY OF THE INVENTION

These and other objects, features and advantages of the invention are accomplished by the dual density digital image system disclosed herein.

A data processing system is disclosed, for storing and displaying digital images, including a workstation having a document input scanner coupled thereto for digitizing document images at a first resolution, an image display unit coupled thereto for displaying digitized document images at a second resolution which is less than the first resolution and a printer coupled thereto for printing digitized document images at a third resolution greater than the second resolution, the workstation coupled to an image host computer and storage.

The system includes a higher resolution bit plane memory in the workstation, having an input coupled to the document scanner for receiving a digitized document image at the first resolution. A higher resolution image compression unit coupled to the higher resolution bit plane memory and has an output coupled to the image host computer, for compressing the first resolution digitized document image and outputting a first compressed image record to the image host computer for storage.

The system further includes a first image storage unit coupled to the image host computer for storing compressed records of images digitized at the first resolution, the image host computer storing the first compressed image record in the first image storage unit.

The system further includes a resolution modification unit having an input coupled to the higher resolution bit plane memory, for reducing the resolution of the first resolution digitized document image to the second resolution and outputting a second resolution digitized document image.

Displaying the second lower resolution image of the digitized document image as the document first enters the system can be accomplished as the system further includes a lower resolution bit plane memory in the workstation, having an input coupled to the resolution modification unit, for receiving the second resolution digitized document image. A lower resolution image compression unit is coupled to the lower resolution bit plane memory and has an output coupled to the image host computer, for compressing the second resolution digitized document image and outputting a second compressed image record to the image host computer for storage, the second compressed image record being smaller in size than the first compressed image record. The image display unit has an input coupled to the lower resolution bit plane memory, for receiving the second resolution digitized document image for display.

The system further includes a second image storage unit coupled to the image host computer for storing compressed records of images digitized at the second resolution, the image host computer storing the second compressed image record in the second image storage unit.

Printing a higher resolution document can be accomplished by the image system as the system further includes a higher resolution image decompression unit having an input coupled to the image host computer, for receiving and decompressing the first compressed image record from the first image storage unit to restore the first resolution digitized document image. An image scaling unit is included having an input coupled to the higher resolution image decompression unit, for converting the first resolution digitized document image into a third resolution digitized document image having the third resolution. A printer is included in the system having an input coupled to the image scaling unit, for receiving the third resolution digitized document image for printing.

Displaying a lower resolution image of the digitized document image after it has been stored in the second storage image unit as the system further includes a lower resolution image decompression unit having an input coupled to the image host computer, for receiving and decompressing the second compressed image record from the second image storage unit to restore the second resolution digitized document image. A lower resolution bit plane memory is included having an input coupled to the lower resolution image decompression unit, for receiving the second resolution digitized document image for display on the image display unit.

The resulting system reduces communications traffic on the network because of the smaller compressed data records which are transmitted for the low resolution operations. Access time for storing and reading the lower resolution compressed data records is also reduced. But this lower traffic and faster access time is obtained without sacrificing the availability of high resolution compressed data records which are occasionally needed for printing and other high resolution operations.

DESCRIPTION OF THE FIGURES

These and other objects, features and advantages of the invention will be more fully appreciated with reference to the accompanying figures.

DISCUSSION OF THE PREFERRED EMBODIMENT

Figure 1:
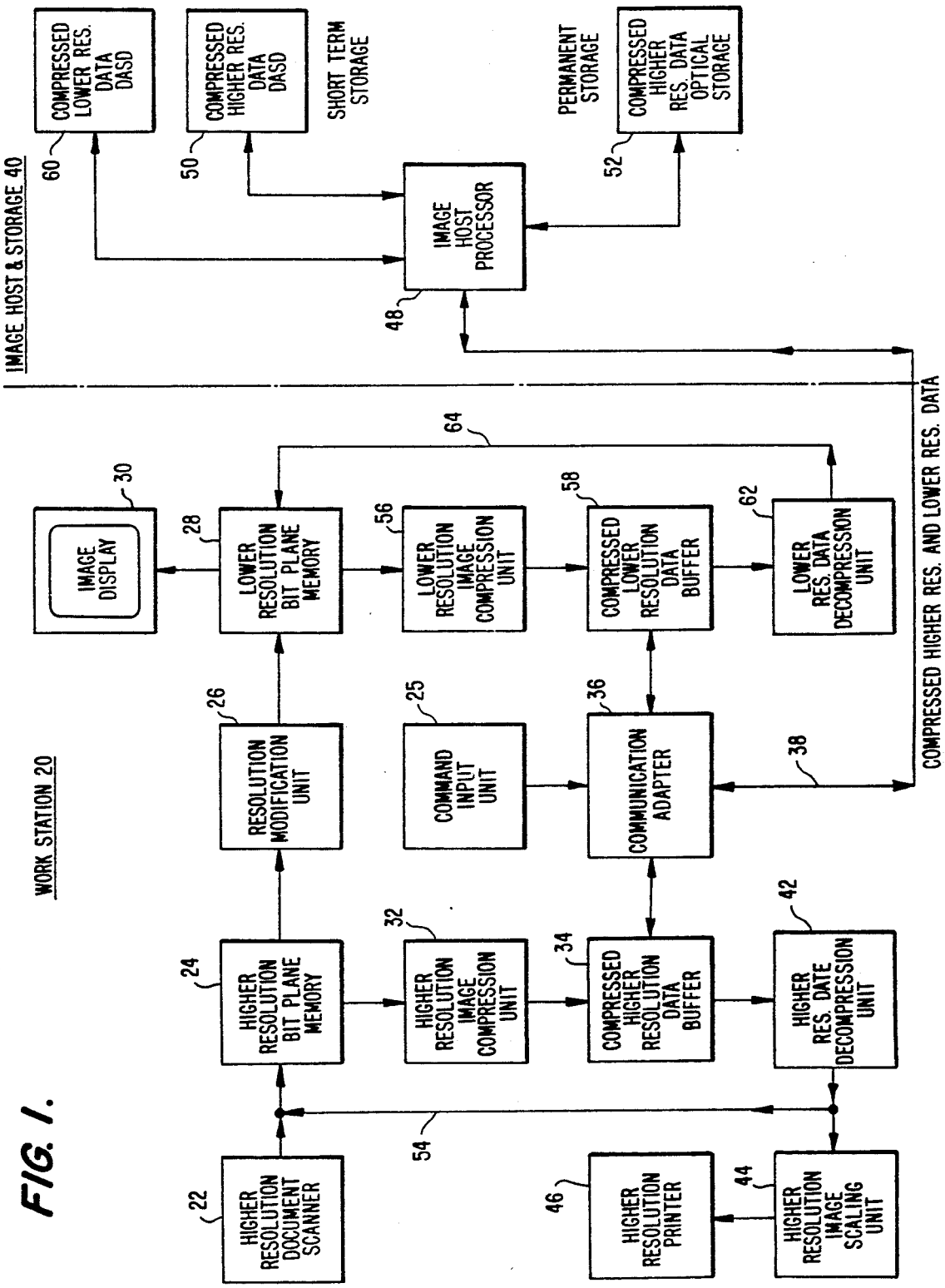
FIG. 1 is an architecture diagram of the dual density digital image system.
Figure 2:
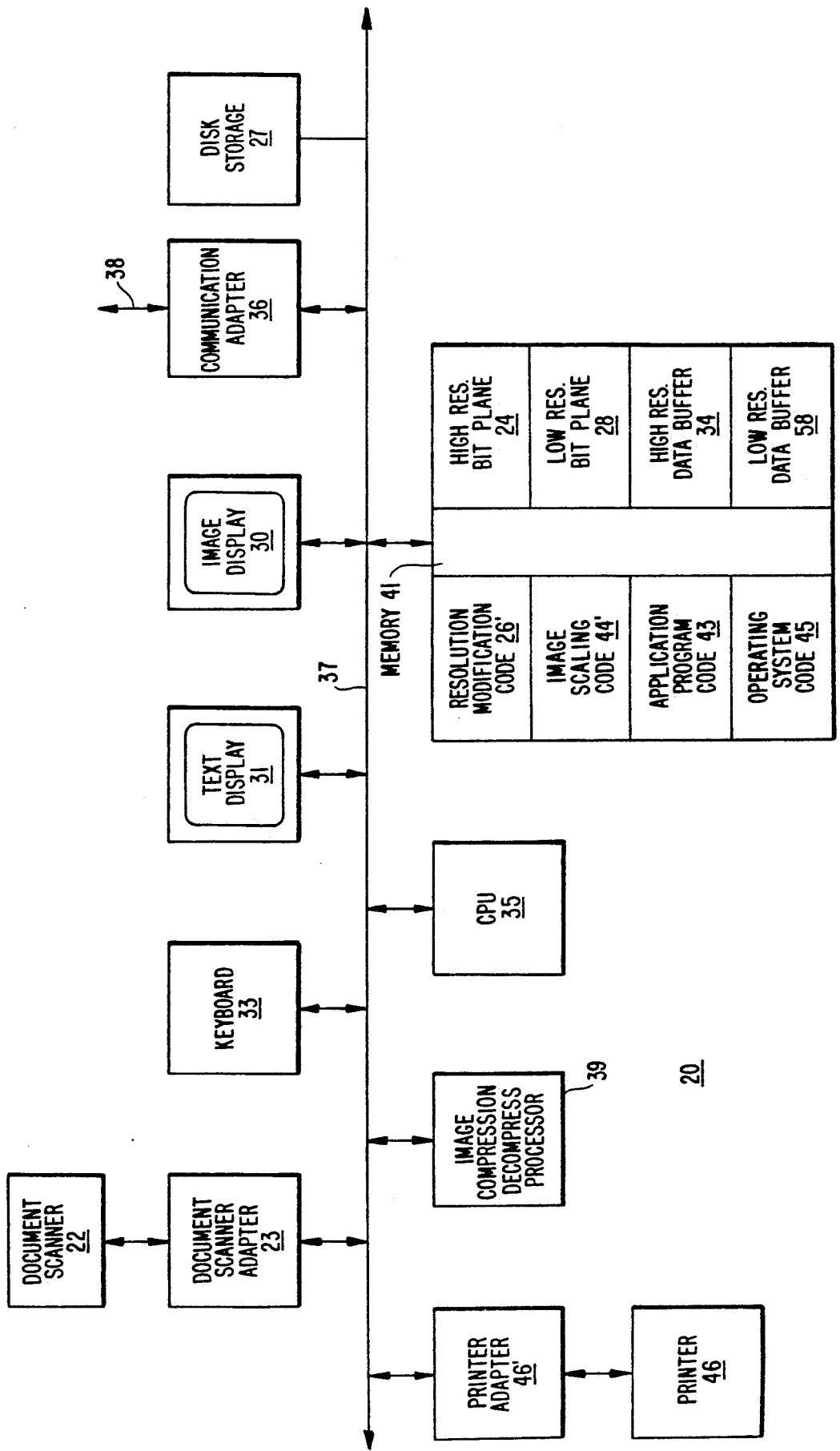
FIG. 2 is a hardware block diagram of the Workstation 20.

FIG. 1 is an architectural diagram of the dual density digital image system which will store and display digital image in accordance with the invention. The architecture diagram depicts the workstation 20 and its connection over a network line 38 to the image host and storage 40. There may be many workstations 20 connected in a local area network to a single image host and storage 40 or to a plurality of image hosts and storages 40. FIG. 2 depicts a hardware block diagram of the workstation 20 shown in FIG. 1. The workstation 20 can be, for example, embodied as an IBM Personal Computer AT Model 339, which is equipped with a high resolution image display 30, and a alphanumeric text display 31 which is the standard type of display for the IBM Personal Computer AT Model 339, as shown in FIG. 2. Also included is a document scanner 22, such as a Bell and Howell 2115 Scanner, which is capable of 200 pel (picture element) per inch resolution. The workstation also includes a disk storage unit 27 which the case of the IBM Personal Computer AT Model 339 is a 30 MB hard disk drive. The image display 30 can be an IBM 3193 monitor which is capable of a 100 pel per inch resolution. Also connected to a workstation 20 can be a printer 46 which can be, for example, an IBM 4216 printer, which is capable of a resolution of from 275 to 300 pels per inch. It can be appreciated from reviewing the resolution characteristics of the document scanner 22, the image display 30, and the printer 46 that a variety of pel resolutions must be accommodated by the digital image storage system. The workstation may alternately have a separate processor handling the alphanumeric display with a separate keyboard connected on its own link to the image host and storage 40.

The image host and storage 40 comprises the image host processor 48, a DASD storage device 50 for temporary storage of higher resolution image data, an optical storage device 52 for permanent storage of higher resolution image data, and possibly a second DASD storage device 60 for temporary storage of lower resolution image data. The image host processor 48 controls both the storage of higher and lower resolution image data in first and second image storage devices 50 and 60. The image host processor 48, can be, for example, an IBM 4381 computer or IBM System/36 Computer or possibly even larger mainframes if the amount of image data is large. DASD storage devices 50 and 60 can be IBM 3380 disk drives which are capable of rapid accessing of digital image data. Permanent storage in an optical disk drive is accomplished in the Laser Storage Magnetic International 1200, or similar optical disk drive unit, a juke box style arrangement where 64 write once optical disks are held in a rack for placement in the optical disk drive. For greater detail on the management of the DASD 50 and 60 and the optical storage 52 by the image host processor 48 please refer to the following copending applications which are hereby incorporated by reference: U.S. Ser. No. 190,612, filed May 5, 1988, entitled "Batching Data Objects for Recording on Optical Disks"; U.S. Ser. No. 190,739, filed May 5, 1988, entitled "Method of Managing Data in a Data Storage Hierarchy and a Data Storage Hierarchy Therefore"; U.S. Ser. No. 190,738, filed May 5, 1988, entitled "A Method of Managing a Media Library"; U.S. Ser. No. 190,421, filed May 5, 1988, entitled "A Multi-Level Peripheral Data Storage Hierarchy with Independent Access to All Levels of the Hierarchy"; and U.S. Ser. No. 190,422, filed May 5, 1988, entitled "Data Storage Hierarchy and Method for Managing Data Therein".

Figure 3:
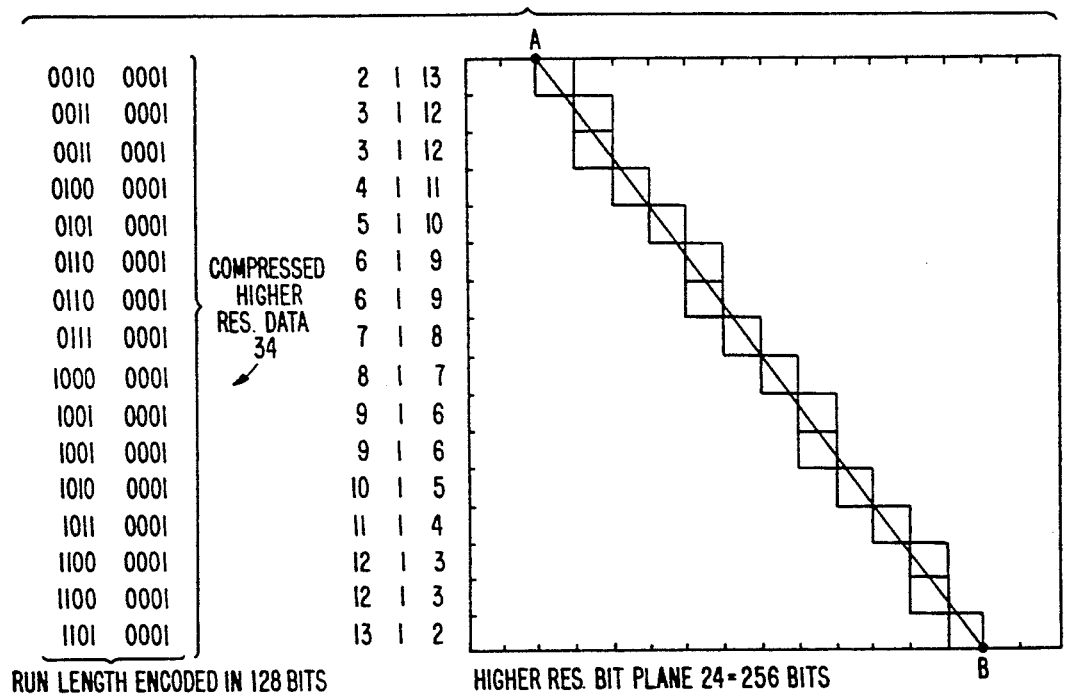
FIG. 3 is a depiction of a higher resolution record including both the higher resolution bit plane 24 and the compressed higher resolution data 34.
Figure 4:
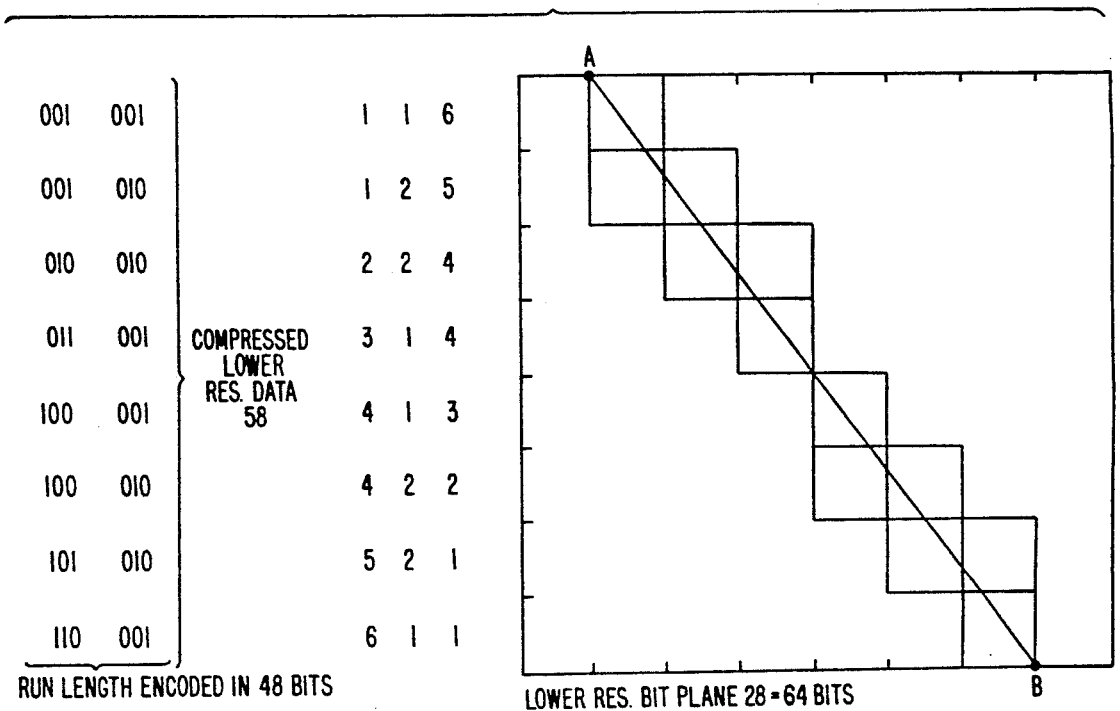
FIG. 4 depicts a lower resolution record and shows the lower resolution bit plane 28 and the corresponding compressed lower resolution data 58.

As is illustrated in FIG. 2, workstation 20 can include a document input scanner 22 which can be coupled through an adapter 23 to the system bus 37 of the workstation. The document input scanner 22 digitizes document images at a first resolution which, in this example, is a 200 pel per inch resolution. To illustrate these image resolutions, FIGS. 3 and 4 show the line A - B is depicted in a high resolution digitization of FIG. 3 and a lower resolution digitization of FIG. 4. In FIG. 3, the line A - B is to be digitized into pel elements in a 16×16 matrix. A 16×16 matrix will have a total of 256 bits for the bit plane representation of the image area. In FIG. 4, the resolution is cut in half so that the image area is divided into an 8×8 matrix and 64 bits are required for the bit plane representing the image area. An image display unit 30 is coupled to the workstation for displaying a digitized document image at a second lower resolution, which in this example is 100 pels and can be illustrated with the lower resolution image in FIG. 4. The printer 46 can be coupled to the workstation for printing digitized document images at a third resolution which, in this example, is 300 pels per inch; this resolution is greater than the 100 pel for the image display 30. For this example, this resolution is also greater than the input resolution from the document scanner 22, which is 200 pels per inch. The workstation is coupled over the communication adapter 36 and the network line 38 to the image host and storage 40.

In the workstation 20 of FIG. 1, a higher resolution bit plane memory 24 has its input coupled to the document scanner 22 for receiving digitized document image at the first, higher resolution of 200 pels, as is represented in FIG. 3. In the hardware depiction of the workstation in FIG. 2, it can be seen that the system memory 41 for the workstation 20 is partitioned into several instruction code regions and several storage or buffer regions. One of the storage regions set aside in memory 41 is for the high resolution bit plane 24.

Also included in the workstation 20 shown in FIG. 1 is a higher resolution image compression unit 32, which is coupled to the higher resolution bit plane memory 24 and which has an output coupled through the compressed higher resolution data buffer 34, and the communication adapter 36, over the line 38 to the image host processor 48 in the image host and storage 40. The compression unit 32 is for compressing the first or higher resolution digitized document image, as depicted in FIG. 3, and for outputting a first compressed image record to the image host computer 48 for storage.

In the image host and storage 40, a first image storage unit 50 is a magnetic disk DASD (Data Acquisition and Storage Device) which is coupled to the image host processor 48 for storing compressed records of images digitized at the first, high resolution corresponding to that shown in FIG. 3. The higher resolution compressed image records in the compressed higher resolution data storage 50.

Referring again to FIG. 1, the workstation 20 also includes a resolution modification device 26 which has an input coupled to the higher resolution bit plane memory 24, and reduces the higher resolution of the first digitized document image corresponding to that shown in FIG. 3 to a second, lower resolution image, such as that shown in FIG. 4. This lower resolution is then output as a second resolution digitized document image to the lower resolution bit plane memory 28. As can be seen in the hardware diagram of FIG. 2, the resolution modification units can be embodied as executable code which is stored in the memory 41 as a resolution modification code 26 prime, which can be executed by the CPU 35 in the workstation. The workstation 20 of FIG. 1 further includes a lower resolution bit plane memory 28, which has an input coupled to the resolution modification unit 26, for receiving the second, lower resolution digitized document image. As is seen in the workstation diagram of FIG. 2, the lower resolution bit plane 28 can be a partitioned portion of the memory 41.

The image display unit 30 has an input coupled to the lower resolution bit plane memory 28, for receiving the second, lower resolution digitized document image for display.

The workstation 20 also includes a lower resolution image compression unit 56, which is coupled to the lower resolution bit plane memory 28, which has an output coupled through the compressed lower resolution data buffer 58, the communication adapter 36 and the network line 38 to the image host processor 48 of the image host and storage 40. The image compression unit 56 compresses the image of the second, lower resolution digitized document, depicted in FIG. 4, and outputs a second compressed image record to the image host computer 48 for storage. The second, lower compressed image record is much smaller in size than the first, higher compressed image record. This is seen in FIGS. 3 and 4, wherein the compressed higher resolution data from the run length encoding operation occupies 128 bits, whereas the run length encoded version of the compressed lower resolution data in FIG. 4 occupies 48 bits. In accordance with the invention, whenever a requirement for lower resolution image data occurs, such as a display of a document, it is preferred to transmit the second, lower resolution compressed image record over the network. Similarly, it is preferable to access the second, lower resolution compressed image records from their storage media, since they impose less of a traffic load on the network, and require less of an access time than does the first, higher resolution compressed image record. The lower resolution data is stored in a second storage unit 60, which is a magnetic disk DASD (Data Acquisition and Storage Device) 60.

The workstation 20 also includes a higher resolution decompression unit 42, having an input coupled from the network line 38 through the communication adapter 36 and the compressed higher resolution data buffer 34, for receiving and decompressing the first higher resolution compressed images corresponding to FIG. 3, for decompressing the first image records from the first image storage device 50, to restore the first, high resolution digitized document image, corresponding to FIG. 3. Referring to FIG. 2, the higher resolution data decompression unit can be a part of the image compression/decompression processor 39, which is connected over the system bus to the CPU 35 in the workstation 20. The compression units 32 and 56 and the decompression units 42 and 62 in the workstation 20 of FIG. 1 can all be embodied in the same image compression/decompression processor 39 of FIG. 2. An example of such a processor is described in the U.S. Pat. No. 4,610,027, by Anderson, et al., "Method for Converting a Bit Map of an Image to a Run Length or Run End Representation," assigned to the International Business Machines Corporation, and incorporated herein by reference. It is also possible to have the compression and decompression algorithms represented by the units 32, 56, 42 and 62 embodied in executable code which is stored, for example, in the application program 43 in the memory 41 of the workstation 20 shown in FIG. 2.

An image scaling unit 44 has an input coupled to the higher resolution image decompression unit 42 in FIG. 1, for converting the first, higher resolution digitized document image into a third resolution digitized document image, having the third resolution, in this example, 300 pels per inch. This third resolution is adapted for the printer 46, which has an input coupled through the printer adapter 46 prime, to the image scaling unit 44. The printer is capable of printing a high resolution image, and the scaling unit 44 will convert the higher resolution 200 pel image which has been accessed from the image host and storage 40, into the appropriate resolution for driving the printer 46. Reference to FIG. 2 will show that the image scaling unit 44 can be embodied in executable code which is the image scaling code 44 prime, stored in the memory 41 and executed by the CPU 35. The third resolution could be 200 pels per inch, or some other resolution greater than the lower resolution used for display, so long as the requirements of document accuracy and compatibility to the printer are met.

The resulting system reduces communications traffic on the network because the smaller compressed data records are transmitted for the low resolution operations. Access time for storing and reading lower resolution compressed data records is also reduced. But this lower traffic and faster access time is obtained without sacrificing the availability of high resolution compressed data records, which are occasionally needed for the high resolution printer and other high resolution operations.

Reference to FIG. 1 will show that a third image storage unit 52 is included in the image host and storage 40, which can be a high capacity optical storage device, suitable for the permanent storage of digitized images. The third image storage device 52 is coupled to the image host processor 48, and stores compressed records of images digitized at the first, higher resolution as represented by FIG. 3. The storage operation is illustrated by the image flow diagram of FIG. 5. The image host processor 48 will transfer the first, higher resolution compressed image records from the first image storage DASD 50 to the third image optical storage device 52, after a predetermined aging period, for example, 30 days.

The system is configured to enable systems operators to have the most recent digital image records on hand on the DASD storage device 50 over a predetermined interval of time, such as 30 days, during which operations with the stored images will usually be completed. During the predetermined period, the image host processor 48, in response to requests from the command input unit 25 at a workstation 20, will selectively access a first, high resolution compressed image record from the first image storage DASD 50. However, after the expiration of the predetermined period, in this example, 30 days, the image host processor 48 will selectively access the first high resolution compressed image record from the third image storage, the optical storage device 52. The image host processor 48 will discard the second, lower resolution compressed image records, such as in FIG. 4, from the second image storage DASD 60 after the expiration of the predetermined period, e.g., the thirty-day period. When the permanent image data stored exceeds the capacity of the optical disks kept in the optical storage 52, older disks may be filed away in a filing cabinet. The image host processor 48 keeps track of those optical disks which have been filed should an old image be required for display or print.

If after the predetermined period, a request is made at the command input unit 25 to retrieve a copy of a digitized image, for display on the display device 30, a lower resolution image, e.g., 100 pels per inch, must be provided for display on the display device 30. However, since the lower resolution image is no longer stored in the image host and storage 40, the image host processor 48 will access a higher resolution data representation of the digitized image, from the permanent optical storage 52, and that compressed high resolution record will be decompressed in the high resolution data decompression unit 42 of the workstation 20. The resulting digitized high resolution image will be directed over line 54 to the higher resolution bit plane memory 24, where it will be applied to the resolution modification unit 26, resulting in a lower resolution image which is applied to the lower resolution bit plane memory 28 for application to the image display 30. This operation is depicted in the image data flow diagram of FIG. 6 for the display operation.

For faster image retrieval than is possible with image storage DASD 50 and 60, the workstation can accommodate a limited number of digitized documents on either the memory 41 or disk storage 27. Both low and high resolution images can be stored in compressed form in disk storage 27. Also, the higher resolution bit plane memory 24 and the lower bit plane memory 28 can store more than one decompressed image at a time. Thus in a four page document, page one can be displayed on image display 30 while pages two, three and four are ready in the lower resolution bit plane memory 28.

The image compression is performed in a variety of ways in the prior art. A simple approach is to apply run length encoding principles for compressing a digitized bit plane image. For example in FIG. 3, the line A - B has been digitized in the bit plane 24 into an array of black and white pels, where each white pel is represented a zero binary value, and each black pel is represented by a one binary value, for a total of 256 bits in the bit plane 24. A simple run length encoding technique can be to always start with a white pel in a row, and then go along the row and count the number of consecutive white pels. For a 16×16 matrix, there will not be more than sixteen consecutive pels having the same black or white value; therefore, a four-bit representation for each run can be used. Every time the color of the pel changes from black to white a next four-bit expression is used to count the number of consecutive next pels of the same color. For example, in the first row of the bit plane 24 of FIG. 3, the first two pels starting at the left side are white; therefore, a first four-bit value of 0010 can be used to run length encode the first two pels. The third pel in the first row is a black pel, and there is only a single black pel. Therefore, the next four-bit expression for the row is 0001, the number of black pels equalling one. As a part of this example, run length encoding technique, since there will always be at most, sixteen pels for a row, the technique stops generating four-bit run length coding numbers so that the last consecutive run of like colored pels is not numbered at all, and the difference from the value of sixteen gives the remaining run length and coded value for the final number of pels. In this case, thirteen white pels complete the first row in FIG. 3. So it is the compressed higher resolution data shown in FIG. 3 which is generated by the image compression unit 32 in FIG. 1 and stored in the buffer 34 of FIG. 1.

Operation

The operation of the dual density digital image system is provided in the following paragraphs.

Referring to FIG. 1, a document is first digitized at the higher resolution document scanner 22 for input into the system. This higher resolution image data is stored initially in the higher resolution bit plane memory 24 where it is accessed by both the resolution modification unit 26 to convert the document data to a lower resolution and the higher resolution image compression unit 32 to compress the digitized document at the higher resolution. The lower resolution image information is initially stored in the lower resolution bit plane memory 28 from which the lower resolution image can be displayed on the image display 30 at this time.

The lower resolution image data is then compressed in the lower resolution image compression unit 56. The compressed higher resolution image data and the compressed lower resolution image data are stored in the compressed high resolution data buffer 34 and the compressed lower resolution data buffer 58 respectively, until the communication adapter 36 can send the image data over network line 38 to the image host and storage 40.

In the image host and storage 40, the image host processor 48 controls the storage of the compressed higher resolution image data and the compressed lower resolution image data in the compressed higher resolution data DASD 50 and the compressed lower resolution data DASD 60 respectively. Optionally, a single DASD may be used for both higher and lower resolution image data. The compressed image data is stored on DASD 50 and 60, until an image data operation such as display or print of an image, or until the predetermined period has expired whereupon the compressed higher resolution data is transferred to permanent optical storage 52.

To display an image on image display 30 after the image data has been stored by the image host and storage 40, the user inputs a display command from the command input unit 25 via communications adapter 36 and network line 38 to the image host and storage 40. The image host processor 48 then finds the compressed lower resolution image data to be displayed where it is stored on the various storage media. If the lower resolution image data is found on DASD, the image host processor 48 sends the data via the network line 38 and communications adapter to the compressed lower resolution data buffer 58. Next the compressed lower resolution image data is decompressed by the lower resolution data decompression unit 62. The decompressed lower resolution data is stored in the lower resolution bit plane memory 28 and displayed on the image display 30.

If the compressed lower resolution image data is unavailable on DASD because the predetermined period has expired, the image host processor 48 retrieves the compressed higher resolution image data stored in optical storage 52. This compressed higher resolution image data is sent via the network line 38 and communication adapter to the compressed higher resolution data buffer 34. Next the compressed higher resolution image data is decompressed by the higher resolution image decompression unit 42. The decompressed higher resolution image data is stored in the higher resolution bit plane memory 24 and converted to lower resolution image data by the resolution modification unit 26. Finally, the lower resolution data is stored in the lower resolution bit plane memory 28 and displayed on the image display 30.

To print a document image after the image has been stored by the image host and storage 40, the user inputs a print command from the command input unit 25 via the communication adapter 36 and network line 38 to the image host and storage 40. The image host processor 48 then finds the compressed higher resolution data on DASD 50 or optical storage 52 and transmits the image data via the network line 38 and the communication adapter 36 to the compressed higher resolution data buffer 34. The compressed higher resolution image data is then decompressed by the higher resolution data decompression unit 42. Finally, the higher resolution image scaling unit 44 takes the decompressed image data and converts to a resolution compatible with the higher resolution printer 46 which prints the image.

Figure 5:
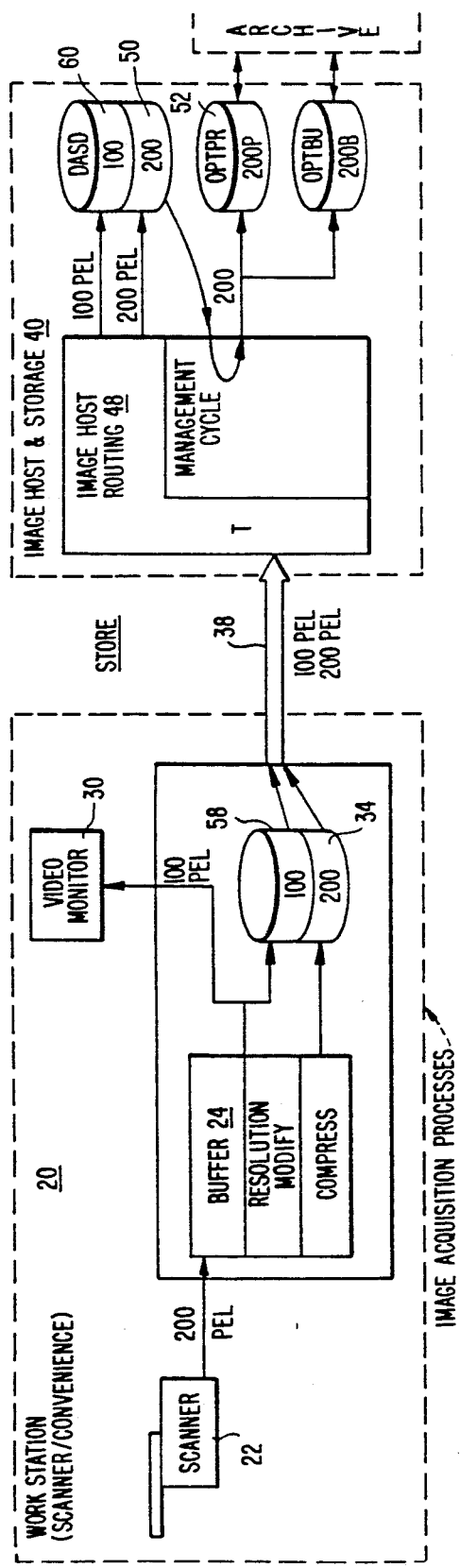
FIG. 5 is an image data flow diagram of a store operation for the invention.

A somewhat different representation of the store operation is shown in FIG. 5. As documents are received, they are identified and scanned. This operation traces the life of the document up to the point that it is stored on an image host and thereafter available for display or print. The store operation will have slight variations and account for local document entry capability that can have either local or remote storage and local or remote backup.

Figure 6:
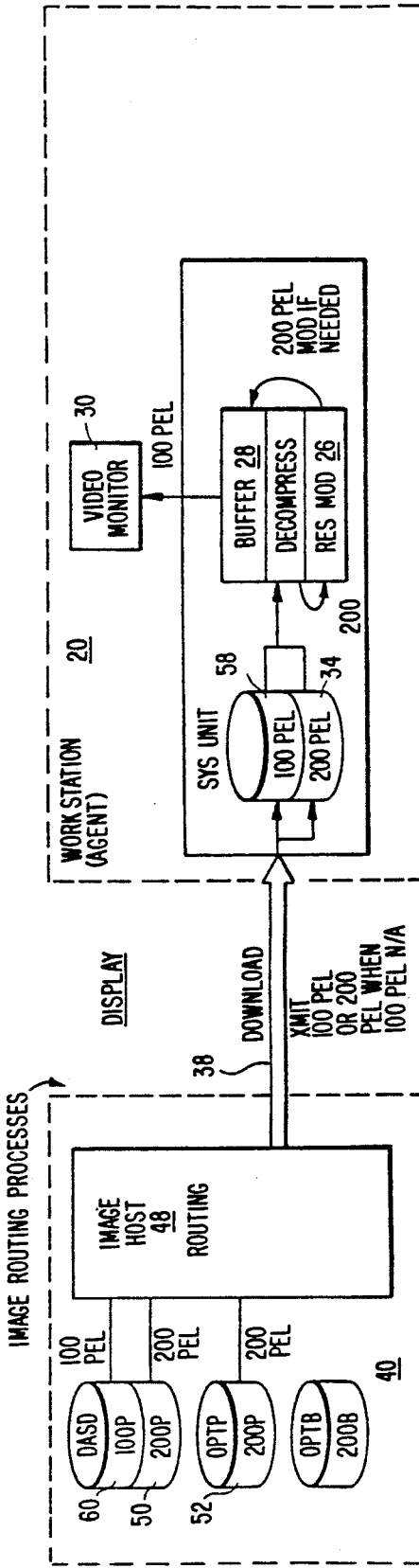
FIG. 6 is an image data flow diagram of a display operation for the invention.

A representation of the display operation is shown in FIG. 6 which provides for viewing of a document at a workstation. A prefetch process can be used to provide a more rapid storage medium so that later display operations can be processed more rapidly. The pre-etch process takes place where a demand for an image can be anticipated and image data is retrieved from relatively slower storage means such as optical storage (or the file cabinet) and stored on DASD. The display process recognizes local or remote storage of digitized images. Those digitized images not immediately available for display can be staged for viewing via a prefetch parameter, which can be built in to the display request.

Figure 7:
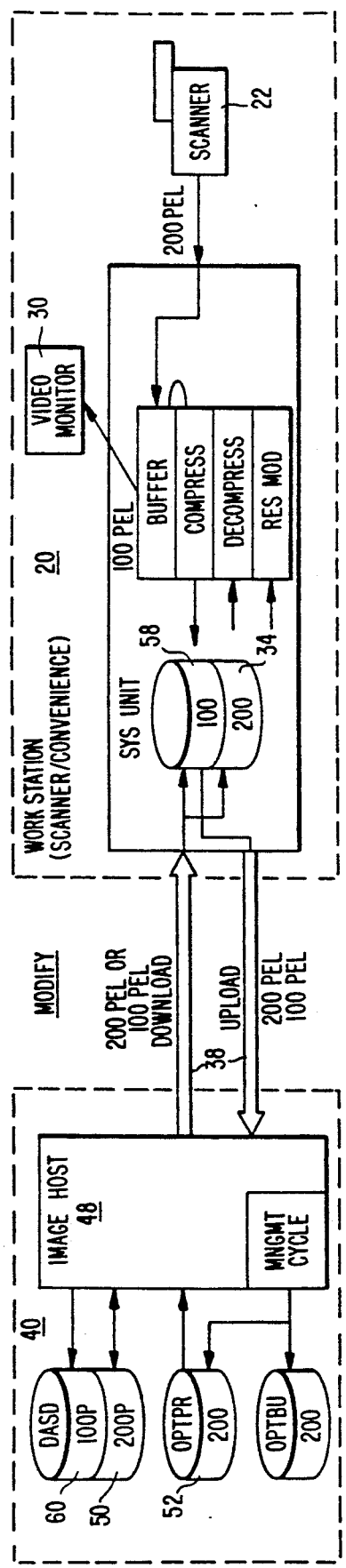
FIG. 7 is an image data flow diagram of a modify operation for the invention.

The image data flow for the modify operation of FIG. 7 works as follows. After a document has been stored, it may become necessary to modify its contents. The digitized image representing a document is never deleted from the optical storage unit 52, but a new modified assemblage of digitized images is created reflecting the modification. There will be variations of the modify operation, depending upon whether new pages must be scanned as additional or replacement pages to the previous version of the stored document. The modified processes are restricted to local image host/storage environments. Modify operations vary according to the need for scanning new pages for existing documents.

Figure 8:
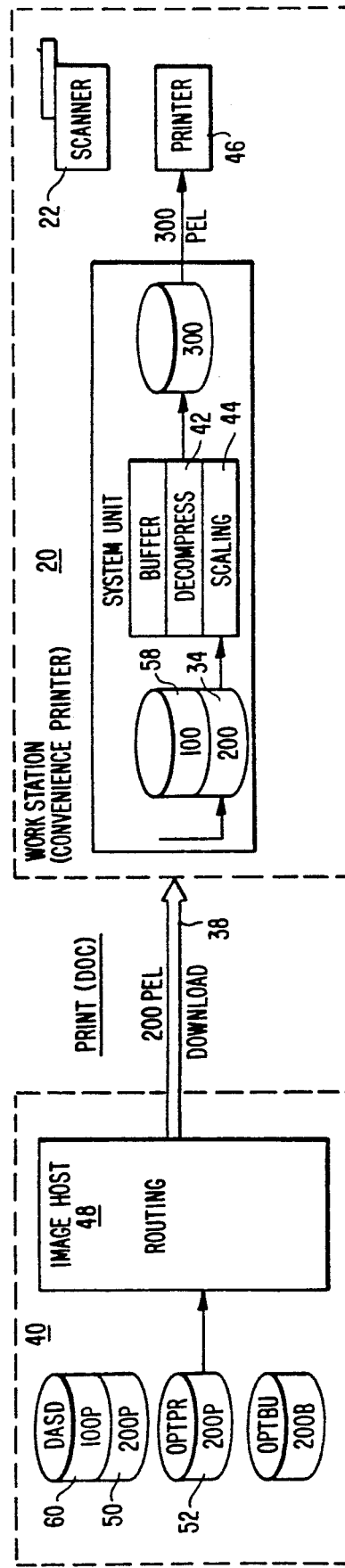
FIG. 8 is an image data flow diagram of a print operation for the invention.

The image data flow for the print operation of FIG. 8 operates as follows. An entire or single page of a document may be printed at a printer workstation. These print requests can originate either directly from a workstation 20 or from the host processor 48 or other system processor. The data being printed can either originate at the workstation or from storage. The print processes vary according to the use of local or remote hosts for printing both documents or a page within a document.

The resulting system reduces communications traffic on the network because of the smaller compressed data records which are transmitted for the low resolution operations. Access times for storing and reading the lower resolution compressed data records are also reduced. But this lower traffic and faster access time is obtained without sacrificing the availability of high resolution compressed data records, which are required for printing operations and other high resolution operations, but are less frequently demanded by users than lower resolution operations such as display of an image.

Although a specific embodiment of the invention has been disclosed, it will be understood by those having skill in the art that changes can be made to the details of the specific embodiment without departing from the spirit and the scope of the invention.

What is claimed is:

1. A data processing system for storing and displaying digital images, including a workstation having a document input scanner coupled thereto for digitizing document images at a first resolution, an image display unit coupled thereto for displaying digitized document images at a second resolution which is less than said first resolution, and a printer coupled thereto for printing digitized document images at a third resolution which is greater than said second resolution, said workstation coupled to an image host computer, comprising:

a memory in said workstation, having an input coupled to said document scanner for receiving a digitized document image at said first resolution;

an image compression means coupled to said memory and having an output coupled to said image host computer, for compressing said first resolution digitized document image and outputting a first compressed image record to said image host computer for storage;

a first image storage means coupled to said image host computer for storing compressed records of images digitized at said first resolution, said image host computer storing said first compressed image record in said first image storage means;

a resolution modification means having an input coupled to said memory, for reducing the resolution of said first resolution digitized document image to said second resolution and outputting a second resolution digitized document image;

said memory having an input coupled to said resolution modification means, for receiving said second resolution digitized document image;

the image display unit having an input coupled to said memory, for receiving said second resolution digitized document image for display;

said image compression unit compressing said second resolution digitized document image and outputting a second compressed image record to said image host computer for storage, said second compressed image record being smaller in size than said first compressed image record;

a second image storage means coupled to said image host computer for storing compressed records of images digitized at said second resolution, said image host computer storing said second compressed image record in said second image storage means;

said host selectively accessing said first image storage means in response to a print command;

said image compression means including an image decompression means having an input coupled to said image host computer, for receiving and decompressing said first compressed image record from said first image storage means to restore said first resolution digitized document image in response to said print command;

the printer coupled to an output of said image decompression means for printing digitized document images at said third resolution;

said host selectively accessing said second image storage means in response to a display command;

said image decompression means receiving from said host computer and decompressing said second compressed image record from said second image storage means to restore said second resolution digitized document image in response to said display command;

said memory receiving from said decompression means said second resolution digitized document image for display on said image display unit.

2. The system of claim 1, which further comprises:
a third image storage means coupled to said image host computer for storing compressed records of images digitized at said first resolution;
said image host computer transferring said first compressed image record from said first image storage means to said third image storage means after a predetermined period.

3. The system of claim 2, which further comprises:
said image host computer selectively accessing said said first compressed image record from said first image storage means before the expiration of said predetermined period;
said image host computer selectively accessing said said first compressed image record from said third image storage means after the expiration of said predetermined period.

4. The system of claim 1, which further comprises:
a third image storage means coupled to said image host computer for storing compressed records of images digitized at said first resolution;
said image host computer transferring said first compressed image record from said first image storage means to said third image storage means after a predetermined period;
said image host computer discarding said second compressed image record from said second image storage means after said predetermined period.

5. The system of claim 4, which further comprises:
said image host computer selectively accessing said said first compressed image record from said third image storage means after the expiration of said predetermined period;
said image decompression means coupled to said image host computer, receiving and decompressing said first compressed image record from said first image storage means to restore said first resolution digitized document image;
said resolution modification means coupled to said image decompression means, for reducing the resolution of said first resolution digitized document image to said second resolution and outputting a second resolution digitized document image;
said image display unit having an input coupled to said resolution modification means, for receiving said second resolution digitized document image for display.

6. A data processing system for storing and displaying digital images, including a workstation having a document input scanner coupled thereto for digitizing document images at a first resolution, an image display unit coupled thereto for displaying digitized document images at a second resolution which is less than said first resolution and a printer coupled thereto for printing digitized document images at a third resolution greater than said second resolution, said workstation coupled to an image host computer, comprising:

a higher resolution bit plane memory in said workstation, having an input coupled to said document scanner for receiving a digitized document image at said first resolution;

a higher resolution image compression unit coupled to said higher resolution bit plane memory and having an output coupled to said image host computer, for compressing said first resolution digitized document image and outputting a first compressed image record to said image host computer for storage;

a first image storage means coupled to said image host computer for storing compressed records of images digitized at said first resolution, said image host computer storing said first compressed image record in said first image storage means;

a resolution modification means having an input coupled to said higher resolution bit plane memory, for reducing the resolution of said first resolution digitized document image to said second resolution and outputting a second resolution digitized document image;

a lower resolution bit plane memory in said workstation, having an input coupled to said resolution modification means, for receiving said second resolution digitized document image;

said image display unit having an input coupled to said lower resolution bit plane memory, for receiving said second resolution digitized document image for display;

a lower resolution image compression unit coupled to said lower resolution bit plane memory and having an output coupled to said image host computer, for compressing said second resolution digitized document image and outputting a second compressed image record to said image host computer for storage, said second compressed image record being smaller in storing capacity than said first compressed image record;

a second image storage means coupled to said image host computer for storing compressed records of images digitized at said second resolution, said image host computer storing said second compressed image record in said second image storage means;

a higher resolution image decompression means having an input coupled to said image host computer, for receiving and decompressing said first compressed image record from said first image storage means to restore said first resolution digitized document image;

an image scaling means having an input coupled to said higher resolution image decompression means, for converting said first resolution digitized document image into a third resolution digitized document image having said third resolution;

said printer having an input coupled to said image scaling means, for receiving said third resolution digitized document image for printing;

a lower resolution image decompression means having an input coupled to said image host computer, for receiving and decompressing said second compressed image record from said second image storage means to restore said second resolution digitized document image;

said lower resolution bit plane memory having an input coupled to said lower resolution image decompression means, for receiving said second resolution digitized document image for display on said image display unit.

7. A workstation for use in a data processing system or storing and displaying digital images, comprising:

a higher resolution bit plane memory in said workstation, having an input coupled to a document scanner for receiving a digitized document image at a first resolution;

a higher resolution image compression unit coupled to said higher resolution bit plane memory and having an output coupled to an image host computer, for compressing said first resolution digitized document image and outputting a first compressed image record to an image host computer for storage;

a resolution modification means having an input coupled to said higher resolution bit plane memory, for reducing the resolution of said first resolution digitized document image to a second resolution and outputting a second resolution digitized document image;

a lower resolution bit plane memory in said workstation, having an input coupled to said resolution modification means, for receiving said second resolution digitized document image;

an image display unit having an input coupled to said lower resolution bit plane memory, for receiving said second resolution digitized document image for display;

a lower resolution image compression unit coupled to said lower resolution bit plane memory and having an output coupled to said image host computer, for compressing said second resolution digitized document image and outputting a second compressed image record to said image host computer for storage, said second compressed image record being smaller in size than said first compressed image record;

a higher resolution image decompression means having an input coupled to said image host computer, for receiving and decompressing said first compressed image record from a first image storage means to restore said first resolution digitized document image;

an image scaling means having an input coupled to said higher resolution image decompression means, for converting said first resolution digitized document image into a third resolution digitized document image having a third resolution;

a lower resolution image decompression means having an input coupled to said image host computer, for receiving and decompressing said second compressing image record from a second image storage means to restore said second resolution digitized document image;

said lower resolution bit plane memory having an input coupled to said lower resolution image decompression means, for receiving said second resolution digitized document image for display on said image display unit.

8. The method of claim 7, which further comprises:

receiving and decompressing said first compressed image record from said first image storage means to restore said first resolution digitized document image;

printing digitized document images at substantially said first resolution.

9. The method of claim 8, which further comprises:

receiving and decompressing said second compressed image record from said second image storage means to restore said second resolution digitized document image;

receiving said second resolution digitized document image for display on said image display unit.

10. The method of claim 9, which further comprises:

transferring said first compressed image record from said first image storage means to a third image storage means after a predetermined period;

discarding said second compressed image record from said second image storage means after said predetermined period.

11. The method of claim 10, which further comprises:
receiving and decompressing said second compressed image record from said second image storage means before the expiration of said predetermined period, to restore said second resolution digitized document image;
receiving said second resolution digitized document image for display on said image display unit.

12. The method of claim 11, which further comprises:
selectively accessing said said first compressed image record from said third image storage means after the expiration of said predetermined period;
receiving and decompressing said first compressed image record from said first image storage means to restore said first resolution digitized document image;
reducing the resolution of said first resolution digitized document image to said second resolution and outputting a second resolution digitized document image;
receiving said second resolution digitized document image for display.

13. A data processing system for inputting, storing, displaying and printing digital images of documents, including a workstation and a host data processor connected thereto, said system comprising:
a document scanner, for inputting a first digitized image of a document at a first pel per inch resolution represented by a first data set;
a resolution modification means coupled to an output of said scanner, for converting said first digitized image to a second digitized image at a second pel per inch resolution less than said first resolution, said second image represented by a second data set which has less information than said first data set;
a data compression means coupled to an output of said scanner and coupled to an output of said resolution modification means, for receiving said first data set from said scanner representing said first image and removing redundant data therefrom forming a compressed first data set having a first plurality of binary digits representing said first image, and receiving said second data set from said modification means representing said second image and removing redundant data therefrom forming a compressed second data set, having a second plurality of binary digits representing said second image, said second plurality being less than said first plurality;
an image display coupled to an output of said modification means, for receiving said second data set and displaying said second image at said second resolution;
a communications adapter coupled to an output of said compression means, for transmitting both said compressed first data set and said compressed second data set over a communications link to said host;
a first bulk storage coupled to said host, for storing said compressed first data set;
a second bulk storage coupled to said host, for storing said compressed second data set;
a command input device coupled to an input of said adapter, for inputting a first request for printing a hard copy of said document which is transmitted over said link to said host;
said host accessing said first bulk storage to fetch said compressed first data set which is transmitted to said adapter over said link in response to said first request;
a data decompression means coupled to an output of said adapter and having an output coupled to a printing means, for receiving said compressed first data set from said adapter and restoring redundant data thereto forming said first data set which is output to said printing means to print a hard copy, in response to said first request;
said command input device inputting a second request for displaying an image of said document on said display which is transmitted over said link to said host;
said host accessing said second bulk storage device to fetch said compressed second data set which is transmitted to said adapter over said link in response to said second request;
said decompression means coupled to said display, for receiving said compressed second data set from said adapter and restoring redundant data thereto forming said second data set which is output to said display, in response to said second request.

14. The system of claim 13 which further comprises:
a third bulk storage coupled to said host, for storing said first compressed data set;
said host transferring said first compressed data set from said first bulk storage to said third bulk storage after a predetermined period following the storage of said compressed first data set on said first bulk storage;
said host selectively accessing said compressed first data set from said first bulk storage before the expiration of said predetermined period;
said host data processor selectively accessing said compressed first data set from said third bulk storage after the expiration of said predetermined period.

* * * * *